United States Patent
Huang (10) Patent No.: US 9,564,660 B2
(45) Date of Patent: Feb. 7, 2017

(54) ELECTRIC CORE FOR THIN FILM BATTERY

(71) Applicant: QingHong Technology Co., Ltd., New Taipei (TW)

(72) Inventor: Chun-Lung Huang, Taipei (TW)

(73) Assignee: QingHong Technology Co., Ltd., Hsinchu (TW)

(*) Notice: Subject to any disclaimer, the term of this patent is extended or adjusted under 35 U.S.C. 154(b) by 211 days.

(21) Appl. No.: 14/316,763

(22) Filed: Jun. 26, 2014

(65) Prior Publication Data

US 2015/0004462 A1 Jan. 1, 2015

Related U.S. Application Data

(60) Provisional application No. 61/839,873, filed on Jun. 27, 2013.

(51) Int. Cl.

| | |
|---|---|
| *H01M 10/05* | (2010.01) |
| *H01M 10/0585* | (2010.01) |
| *H01M 10/0525* | (2010.01) |
| *H01M 2/02* | (2006.01) |
| *H01M 2/16* | (2006.01) |

(52) U.S. Cl.
CPC ....... *H01M 10/0585* (2013.01); *H01M 2/0207* (2013.01); *H01M 2/168* (2013.01); *H01M 10/0525* (2013.01); *Y02E 60/122* (2013.01); *Y02P 70/54* (2015.11)

(58) Field of Classification Search
CPC ............ H01M 10/058; H01M 10/0585; H01M 10/0525; H01M 2/0207; H01M 2/168; Y02E 60/122
See application file for complete search history.

(56) References Cited

U.S. PATENT DOCUMENTS

| | | | | |
|---|---|---|---|---|
| 2004/0101757 | A1* | 5/2004 | Kii | H01M 2/1653 429/253 |
| 2010/0323242 | A1* | 12/2010 | Choi | H01M 4/13 429/217 |
| 2011/0123862 | A1* | 5/2011 | Nam | H01M 4/0421 429/209 |

* cited by examiner

*Primary Examiner* — Raymond Alejandro
(74) *Attorney, Agent, or Firm* — Winston Hsu; Scott Margo (57) ABSTRACT

A laminated electric core for a lithium-ion battery includes a first current collecting substrate; a first electrode active material layer coated or adhered on an inner surface of the first current collecting substrate; a second current collecting substrate; a second electrode active material layer coated or adhered on an inner surface of the second current collecting substrate; a separator sandwiched between the first electrode active material layer and the second electrode active material layer, wherein an electrolyte is retained at least in the separator; and an adhesive layer between the first electrode active material layer and the separator.

17 Claims, 10 Drawing Sheets

ELECTRIC CORE FOR THIN FILM BATTERY

CROSS REFERENCE TO RELATED APPLICATIONS

This application claims the benefit of U.S. provisional application No. 61/839,873, filed Jun. 27, 2013, which is included in its entirety herein by reference.

BACKGROUND OF THE INVENTION

1. Field of the Invention

The present invention relates generally to the field of batteries. More particularly, the present invention relates to a bendable, robust electric core for thin film batteries and manufacturing method thereof.

2. Description of the Prior Art

Lithium-ion secondary batteries or lithium-ion batteries are getting more and more attentions and have been widely used in various kinds of electronic products such as laptops and mobile phones. In secondary batteries, the electron producing and consuming reactions are for the most part reversible, and therefore such a battery can be cycled between a charged and discharged state electrochemically.

When the rechargeable battery is charged, ions formed of the cathode material pass from the cathode through the electrolyte to the anode, and when the battery is discharged these ions travel back from the anode through the electrolyte to the cathode. For example, in batteries having a cathode comprising lithium, such as a $LiCoO_2$ or $LiMnO_2$ cathode, lithium species originating from the lithium-containing cathode travel from the cathode to the anode and vice versa during the charging and discharging cycles, respectively.

Figure 1:
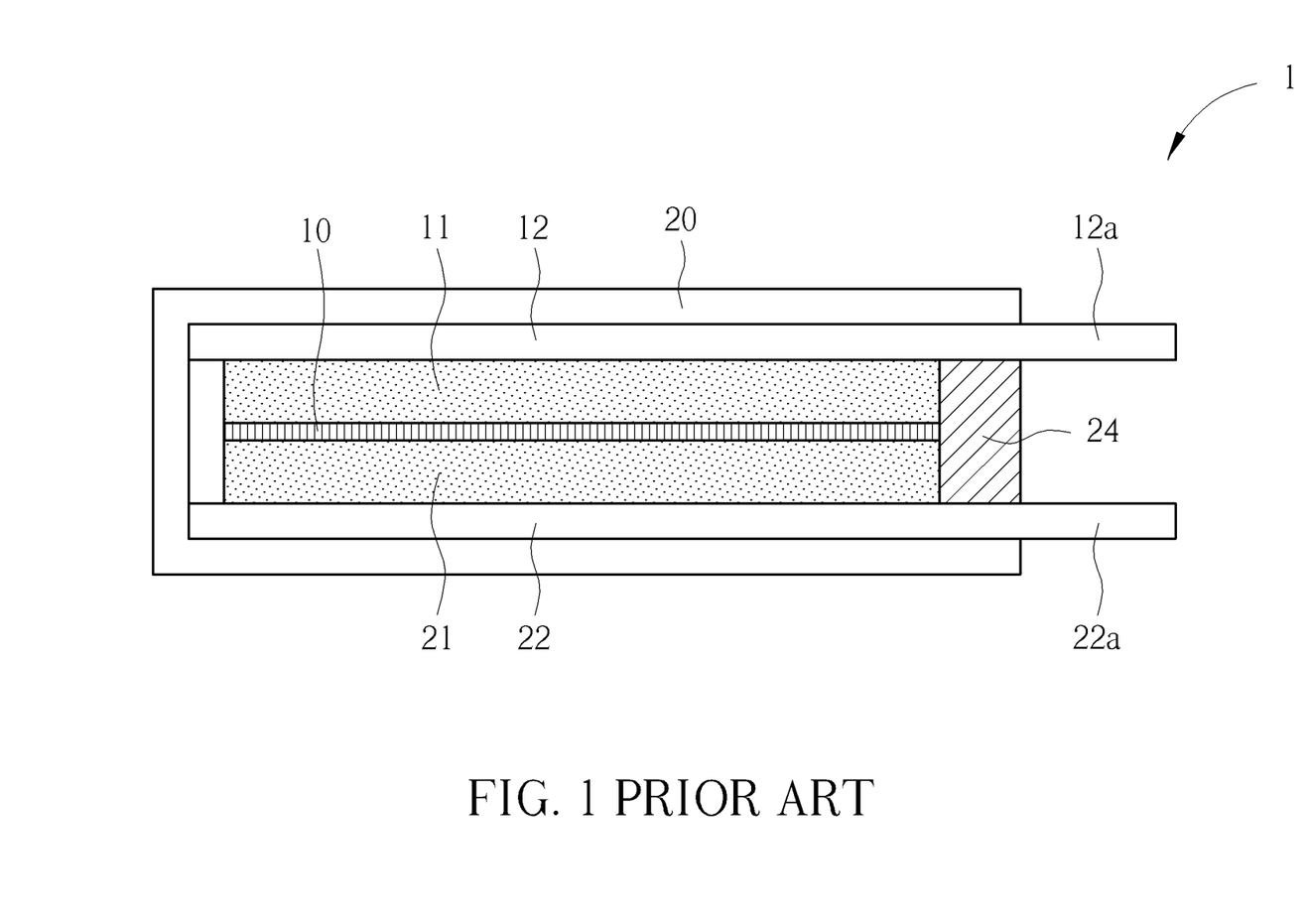
FIG. 1 illustrates a conventional structure of a lithium-ion battery.

FIG. 1 illustrates a conventional structure of a lithium-ion battery. As shown in FIG. 1, the lithium-ion battery 1 includes an electrochemical cell comprising an anode active material layer 11 disposed on one side surface of a separator 10, a cathode active material layer 21 disposed on the other side surface of the separator 10, an anode current collector 12, and a cathode current collector 22. The separator 10 may be made of polymers such as polyimide (PI), polyprolene (PP), polyethylene (PE), polyvinyl chloride (PVC) or polycarbonate (PC) having porous structure to only allow the passage of the lithium ions, while preventing internal shorting between the anode active material layer 11 and the cathode active material layer 21. To electrically connect the anode current collector 12 and the cathode current collector 22 to an external circuit or device, the lithium-ion battery 1 may further include two outwardly extended tabs 12a and 22a.

Typically, the separator 10, the anode active material layer 11 and the cathode active material layer 21 are wetted with a liquid electrolyte solution or gel electrolyte. The electrochemical cell is typically enclosed in a parallelepipedic metal case 20 such as an aluminum case in a gas-tight manner with a sealant layer 24 securely sealing a gap between the tabs 12a and 22a.

Figure 2:
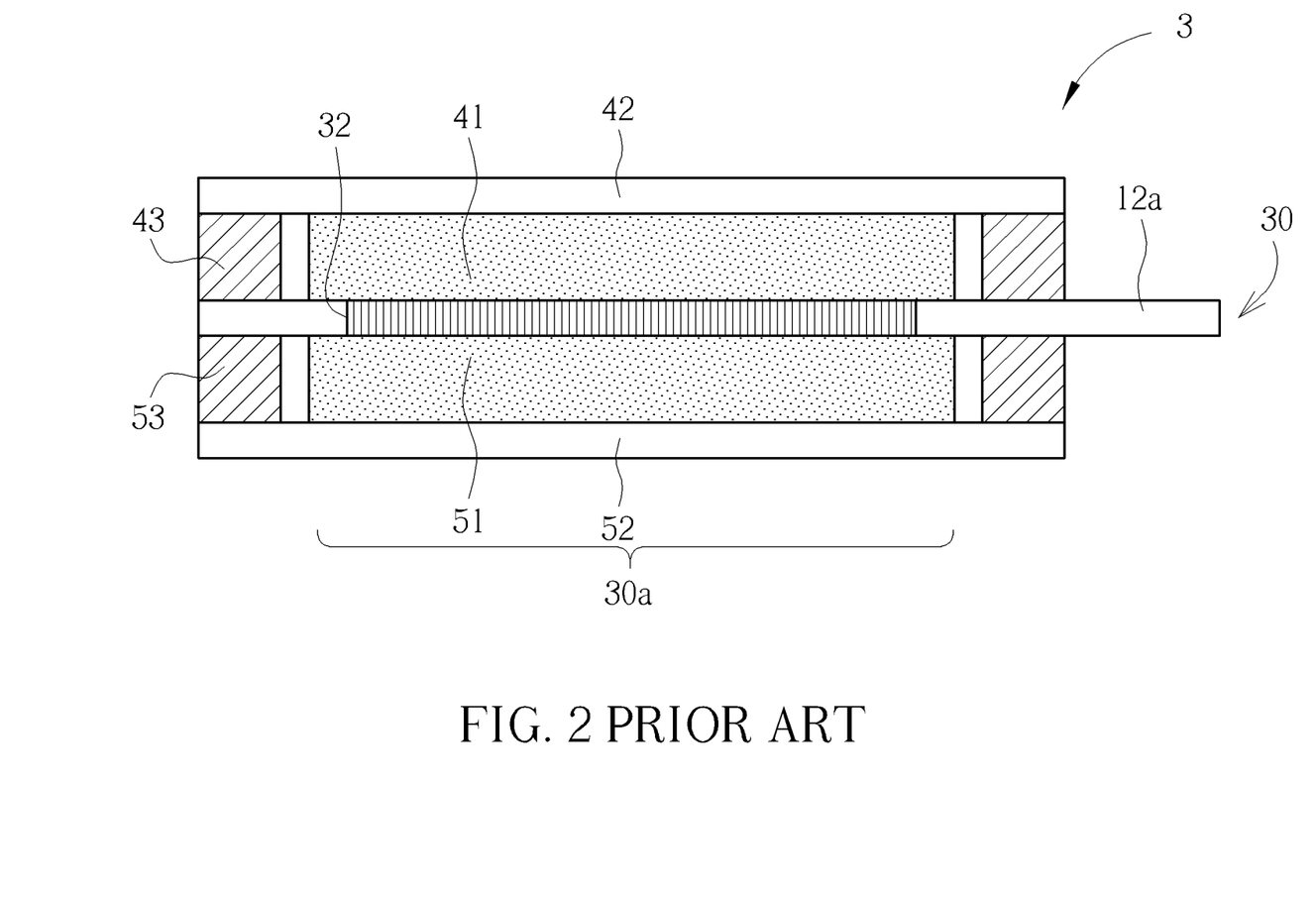
FIG. 2 illustrates another form of a lithium-ion battery known in the art.

FIG. 2 illustrates another form of a lithium-ion battery known in the art. As shown in FIG. 2, the lithium-ion battery 3 is integrated with a circuit substrate 30 such as a copper clad laminate (CCL) substrate. The base dielectric of the CCL substrate may include polyimide (PI), polyethylene terephthalate (PET) or glass fiber. The circuit substrate 30 includes a separator portion 30a having therein a plurality of through holes or porous structures for the passage of lithium ions. The separator portion 30a is sandwiched by a pair of electrodes 41 and 51. A current collector 42 is disposed directly on a top surface of the electrode 41. The electrode 41 is sealed by a packaging unit 43. Likewise, a current collector 52 is disposed directly on a top surface of the electrode 51. The electrode 51 is sealed by a packaging unit 53. Both of the current collectors 42 and 52 are typically made of expensive CCL substrates. The use of CCL substrates increases manufacturing cost/complexity and battery weight.

Portable electronic devices have been progressively reduced in size and weight and improved in performance. It is therefore required to develop a rechargeable lithium-ion battery or lithium-ion secondary cell having a high energy density and a high output, which is also cost-effective. Further, after being stored or circled for certain numbers, gas may be generated in lithium-ion batteries, especially at high temperature, which will reduce life span of the lithium-ion battery. What is needed, therefore, is to provide a robust electric core for lithium-ion thin film batteries which has desirable life span.

SUMMARY OF THE INVENTION

One object of the present invention is to provide a bendable, robust electric core for lithium-ion thin film batteries, which is cost-effective, and has simple structure, high capacity, desirable life span, and cycle performance.

Another object of the present invention is to provide a bendable, robust electric core for lithium-ion thin film batteries, which has improved ability of gas resistance and moisture resistance.

According to one embodiment, a laminated electric core for a lithium-ion battery includes a first current collecting substrate, a first electrode active material layer coated or adhered on an inner surface of the first current collecting substrate, a second current collecting substrate, a second electrode active material layer coated or adhered on an inner surface of the second current collecting substrate, a separator sandwiched between the first electrode active material layer and the second electrode active material layer, an electrolyte retained at least in the separator.

An adhesive layer may be provided to tightly bond the first electrode active material layer to the separator. In another embodiment, an adhesive layer may be provided to tightly bond the first/second electrode active material layer to the first/second current collecting substrate. Optionally, the adhesive layer may have a large number of through holes that communicate the first electrode active material layer with the separator. The adhesive layer may create an intimate interfacial contact between adjacent layers and effectively prevent delamination between layers when the battery cell is bent.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The accompanying drawings are included to provide a further understanding of the embodiments, and are incorporated in and constitute apart of this specification. The drawings illustrate some of the embodiments and, together with the description, serve to explain their principles. In the drawings.

It should be noted that all the figures are diagrammatic. Relative dimensions and proportions of parts of the drawings are exaggerated or reduced in size, for the sake of clarity and convenience. The same reference signs are generally used to refer to corresponding or similar features in modified and different embodiments.

DETAILED DESCRIPTION

In the following description, numerous specific details are given to provide a thorough understanding of the invention. It will, however, be apparent to one skilled in the art that the invention may be practiced without these specific details. Furthermore, some well-known system configurations and process steps are not disclosed in detail, as these should be well-known to those skilled in the art.

Likewise, the drawings showing embodiments of the apparatus are semi-diagrammatic and not to scale and some dimensions are exaggerated in the figures for clarity of presentation. Also, where multiple embodiments are disclosed and described as having some features in common, like or similar features will usually be described with like reference numerals for ease of illustration and description thereof.

The following sets forth a detailed description of a mode for carrying out the invention. The description is intended to be illustrative of the invention and should not be taken to be limiting. It is understood that present invention may be applicable to both primary batteries and secondary batteries, although some embodiments take the secondary battery as an example.

Figure 3:
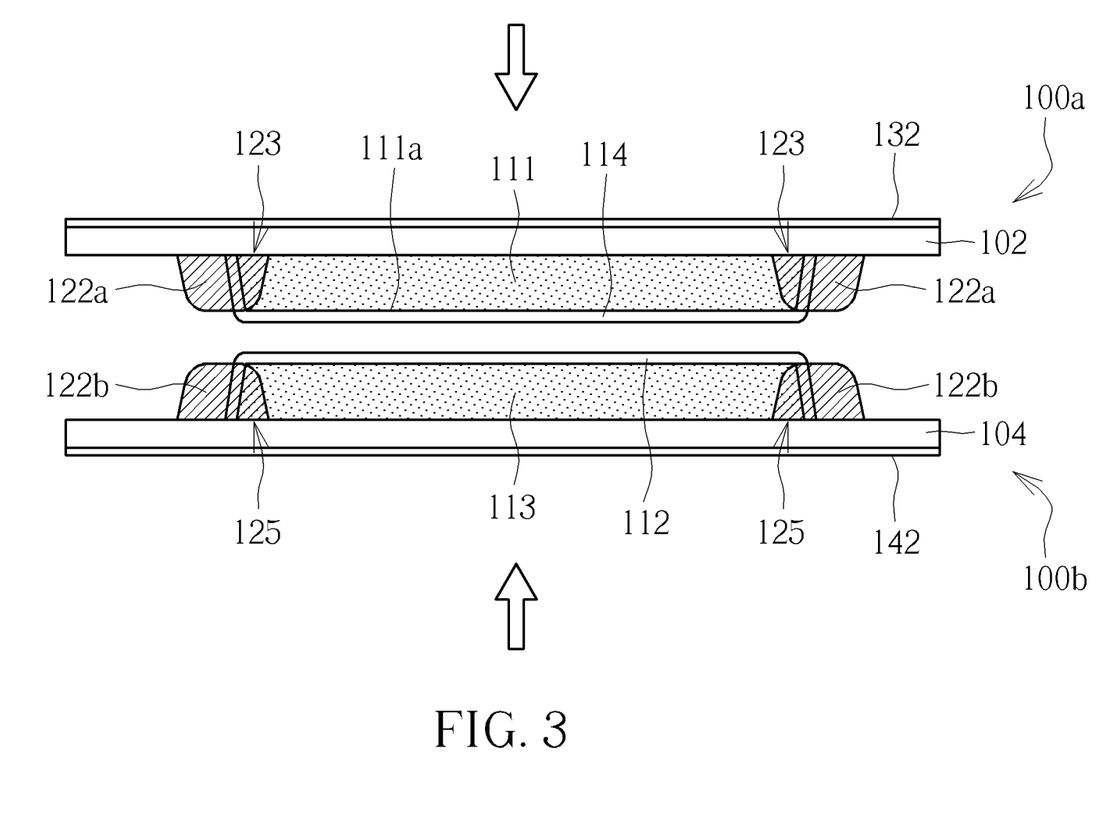
FIGS. 3 and 4 schematically illustrate a method for fabricating a bendable, robust electric core for thin film lithium-ion batteries according to one embodiment of the invention.
Figure 4:
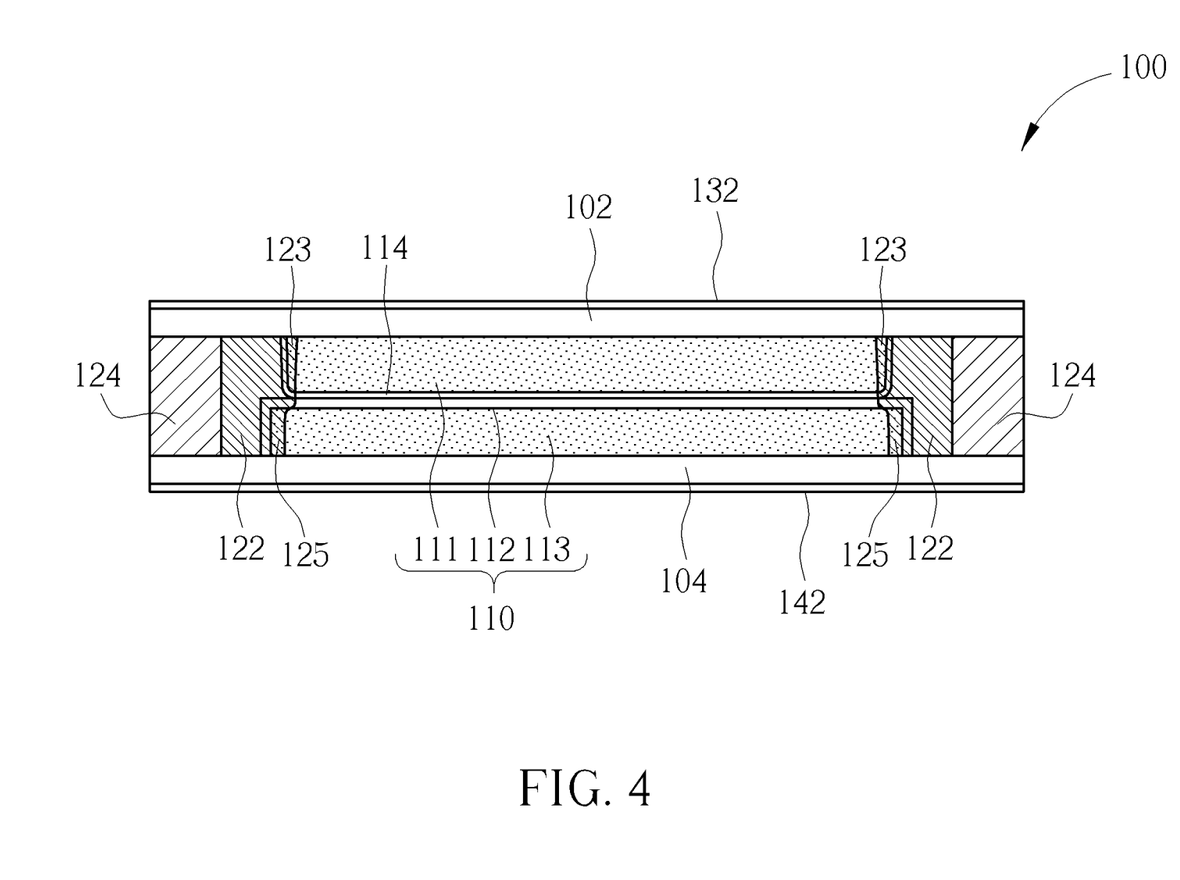

FIG. 3 and FIG. 4 schematically illustrate a method for fabricating an electric core for thin film lithium-ion batteries according to one embodiment of the invention.

As shown in FIG. 3 and FIG. 4, a first substrate 100a and a second substrate 100b are prepared. According to the embodiment, the first substrate 100a comprises a first current collecting substrate 102, a first electrode active material layer 111 on an inner surface of the first current collecting substrate 102, and a thin adhesive layer 114 directly coated or sprayed onto the first electrode active material layer 111. The first electrode active material layer 111 may be formed by using coating, stencil printing, gravure printing, letterpress or screen printing techniques. According to the embodiment, the thin adhesive layer 114 may be coated on the bottom surface 111a of the first electrode active material layer 111 and the sidewall of the first electrode active material layer 111. However, in another embodiment, the thin adhesive layer 114 may be coated only on the bottom surface 111a of the first electrode active material layer 111. The outer surface of the first current collecting substrate 102 may be covered with a covering insulation layer 132 such as polyimide (PI), polyvinyl chloride (PVC), polypropylene (PP), polyethylene (PE), polycarbonate (PC), polyurethane (PU), or polyethylene terephthalate (PET), but not limited thereto. According to the embodiment, the thin adhesive layer 114 may include, but not limited to, polyvinyl chloride (PVC), polyethylene terephthalate (PET), polyimide (PI), polypropylene (PP), polyethylene (PE), silica gel, acrylic, polymethylmethacrylate (PMMA), or epoxy materials.

According to another embodiment, the thin adhesive layer 114 may be sprayed on the bottom surface 111a of the first electrode active material layer 111 and the sidewall of the first electrode active material layer 111. The thin adhesive layer 114 may be formed in various patterns and may be discontinuous across the bottom surface 111a of the first electrode active material layer 111. For example, the thin adhesive layer 114 may be sprayed into dotted pattern or lattice pattern such that after lamination the adhesive layer becomes thinner and the total resistance of the battery is reduced.

According to the embodiment, the first electrode active material layer 111 is then subjected to a curing process at relatively higher temperatures to remove the solvent from the first electrode active material layer 111. Along the peripheral edges of the first electrode active material layer 111, a sealant layer 122a is provided after curing the first electrode active material layer 111. The sealant layer 122a may be formed on the inner surface of the first current collecting substrate 102 by using any suitable techniques known in the art, for example, screen printing, stencil printed, gravure printed, letterpress or coating. The ingredients of the sealant layer 122a permeate through the thin adhesive layer 114 into the porous structure of the first electrode active material layer 111 to thereby form an elastic and robust overlapping interface 123 along the peripheral edges of the first electrode active material layer 111. According to the embodiment, no space or gap is remained between the sealant layer 122a and the peripheral edges of the first electrode active material layer 111 because of the formation of the elastic and robust overlapping interface 123. According to the embodiment, the elastic and robust overlapping interface 123 prevents cracking of the first electrode active material layer 111 along the peripheral edges even after frequent bending of the electric core.

According to the embodiment, the second substrate 100b comprises a second current collecting substrate 104, a second electrode active material layer 113 coated, stencil printed, gravure printed, letterpress or screen printed on an inner surface of the second current collecting substrate 104, and a separator 112 directly covering a top surface and sidewall of the second electrode active material layer 113. On the bottom surface of the second current collecting substrate 104, a covering insulation layer 142 may be provided. The covering insulation layer 142 may comprise polyimide (PI), polyvinyl chloride (PVC), polypropylene (PP), polyethylene (PE), polycarbonate (PC), polyurethane (PU), or polyethylene terephthalate (PET), but not limited thereto. According to the embodiment, the first electrode active material layer 111, the thin adhesive layer 114, the separator 112, and the second electrode active material layer 113 they all have porous structures to allow passage of the lithium ions or electrolyte.

Likewise, along the peripheral edges of the second electrode active material layer 113, a sealant layer 122b is provided after curing the second electrode active material layer 113. The sealant layer 122b may be formed on the inner surface of the second current collecting substrate 104 by using any suitable techniques known in the art, for example, screen printing, stencil printed, gravure printed, letterpress or coating. The ingredients of the sealant layer 122b permeate through the separator 112 into the porous structure of the second electrode active material layer 113 to thereby form an elastic and robust overlapping interface 125 along the peripheral edges of the second electrode active material layer 113. According to the embodiment, no space or gap is remained between the sealant layer 122a/122b and the peripheral edges of the first/second electrode active material layer 111/113 because of the formation of the elastic and robust overlapping interface 123/125.

According to the embodiment, the first current collecting substrate 102 may be a positive current collecting substrate, the first electrode active material layer 111 may be a positive electrode active material layer, the second current collecting substrate 104 may be a negative current collecting substrate, and the second electrode active material layer 113 may be a negative electrode active material layer. However, it is understood that the aforesaid polarities may be interchangeable. For example, in another embodiment, the first current collecting substrate 102 may be a negative current collecting substrate, the first electrode active material layer 111 may be a negative electrode active material layer, the second current collecting substrate 104 may be a positive current collecting substrate, and the second electrode active material layer 113 may be a positive electrode active material layer.

According to the embodiment, the first electrode active material layer 111 and the second electrode active material layer 113 may be both wetted with a liquid or gel electrolyte solution. According to another embodiment, the first electrode active material layer 111 and the second electrode active material layer 113 may be surrounded by an electrolyte gel or a solid-state electrolyte such as a solid polymer electrolyte.

According to the embodiment, the thin adhesive layer 114 is provided to tightly bond the first electrode active material layer 111 to the separator 112. Optionally, the thin adhesive layer 114 may have a large number of through holes that communicate the first electrode active material layer 111 with the separator 112. The thin adhesive layer 114 may create an intimate interfacial contact between adjacent layers and effectively prevent delamination between layers when the battery cell is bent. The thin adhesive layer 114 may be coated or sprayed onto the first current collecting substrate 102. Alternatively, the thin adhesive layer 114 may be formed by using transfer printing or indirect printing techniques. In another embodiment, the adhesive layer 114 may be in a form of a dry film.

As shown in FIG. 4, the first substrate 100a and the second substrate 100b may be bonded together by using vacuum laminating under heating and pressing conditions, thereby forming a laminate structure of an electric core 100. For example, the first substrate 100a and the second substrate 100b may be bonded together in a heating-type vacuum press apparatus. However, it is understood that, in some cases, a vacuum laminating (without heating) and pressing process may be adequate. In other embodiments, the first substrate 100a and the second substrate 100b may be bonded together by chemical reactions. The sealant layers 122a and 122b immerge with one another and bonded together to form a sealant layer 122.

In other embodiments, the sealant layers 122a and 122b may be bonded together by adhesive to form a sealant layer 122. Additionally, a packaging layer 124 may be provided to further seal the battery cell 100. During the heating and pressing process, the insulating coating 206 in the thin adhesive layer 114 melts and thus provides intimate interfacial contact between adjacent layers and effectively prevent delamination or cracking between layers when the battery cell is bent.

Figure 5:
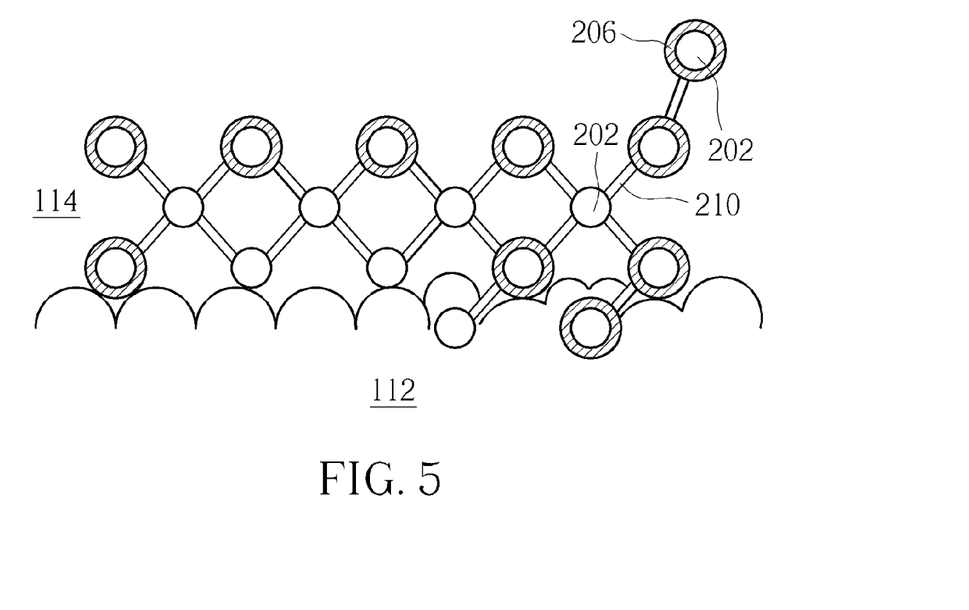
FIGS. 5 and 6 show exemplary structures of the adhesive layer in FIGS. 3 and 4 in accordance with the invention.

FIGS. 5 and 6 show two exemplary structures of the thin adhesive layer 114 in accordance with the invention. Generally, the thin adhesive layer 114 may comprise insulating particles and polymeric binder matrix including but not limited to styrene-butadiene rubber (SBR), polyvinylidene fluoride (PVDF), carboxyl methyl cellulose (CMC) or the like. As shown in FIG. 5, the thin adhesive layer 114 comprises a plurality of particles 202 dispersed in the binder 210 including but not limited to SBR, PVDF, or CMC. At least some of the particles 202 are provided with an insulating coating 206. The insulating coating 206 may include, but not limited to, polyvinyl chloride (PVC), polyethylene terephthalate (PET), polyimide (PI), polypropylene (PP), polyethylene (PE), silica gel, acrylic, or epoxy materials. According to the embodiment, the particles 202 are non-conductive particles such as metal oxide, glass fiber particles, or ceramic particles. For example, the metal oxide may include titanium oxide, silicon oxide, aluminum oxide, or combination thereof. The particles 202 may have irregular shapes and various dimensions. According to the embodiment, the thin adhesive layer 114 may be coated or sprayed onto the irregular surface of the separator 112 and some of the particles may extend and be embedded into the separator 112 to thereby form a strong bonding.

Figure 6:
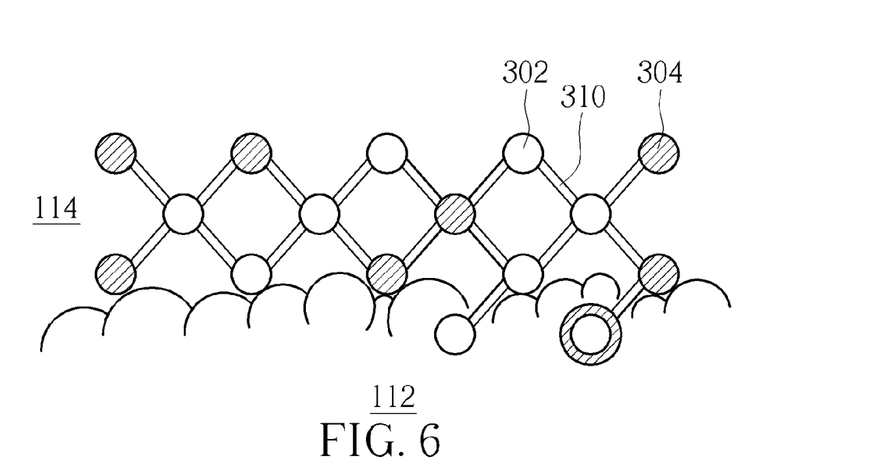

As shown in FIG. 6, the thin adhesive layer 114 may comprise two different kinds of particles 302 and 304 dispersed in the binder 310. The binder 310 may include but not limited to SBR, PVDF, or CMC. The carrier particles 302 may include non-conductive particles such as metal oxide, glass fiber particles, or ceramic particles. For example, the metal oxide may include titanium oxide, silicon oxide, aluminum oxide, or combination thereof. The particles 304 may comprise polymeric particles such as PVC, PET, PI, PP, or PE. Alternatively, the two kinds of particles 302 and 304 may be polymeric particles having different physical properties such as melting points or chemical properties such as ability to participate in an addition reaction or condensation reaction. Likewise, the particles 302 and 304 may have irregular shapes and various dimensions. The thin adhesive layer 114 may be coated or sprayed onto the irregular surface of the separator 112 and some of the particles 302/304 may be inlaid into the separator 112 to thereby form a strong bonding.

Still referring to FIG. 3, the first current collecting substrate 102 may be any conductor well known in the art such as an aluminum, nickel, steel foil, carbon foil, graphene, or copper foil. According to the embodiment, the first electrode active material layer 111 may comprise a positive electrode active substance and an adhesive, in which the positive electrode active substance may be any one known in the art for the lithium ion battery. According to the embodiment of the present disclosure, the positive electrode active substance may comprise $LiCoO_2$, $LiFePO_4$, $LiMn_2O_4$, or any suitable three-component substances known in the art. The adhesive may be any one well known in the art such as PVDF. According to some embodiments of the present disclosure, the positive electrode active material layer may also comprise positive electrode additives. The positive electrode additive may be any one well known in the art and may be selected from conductive agents, for example, at least one of acetylene black, conductive carbon black and conductive graphite.

The second current collecting substrate 104 may be any one well known in the art such as aluminum, nickel, steel foil, carbon foil, grapheme, or copper foil. According to the embodiment, the second electrode active material layer 113 may comprise a negative electrode active substance and an adhesive. The negative electrode active substance may be anyone commonly used in lithium ion batteries, such as natural graphite and artificial graphite. The adhesive may be any one well known in the art such as PVDF and polyvinyl alcohol.

The first electrode active material layer 111 and the second electrode active material layer 113 may be wetted or surrounded by an electrolyte. For example, the electrolyte may comprise a lithium salt electrolyte and solvent. However, it is understood that, in some cases, solvent-free electrolyte or solid-state electrolyte or gel electrolyte may be used. The lithium salt electrolyte may be at least one selected from lithium hexafluorophosphate ($LiPF_6$), lithium perchlorate ($LiClO_4$), lithium tetrafluoroborate ($LiBF_4$), lithium hexafluoroarsenate ($LiAsF_6$), lithium halide, lithium aluminum tetrachloride and lithium fluoro-alkyl sulfonate. The solvent may comprise an organic solvent, such as a mixture of chain-like acid esters or cyclic acid esters. The chain-like acid ester may comprise at least one selected from dimethyl carbonate (DMC), diethyl carbonate (DEC), ethyl methyl carbonate (EMC), methyl propyl carbonate (MPC), dipropyl carbonate (DPC) and other fluorine-containing, sulfur-containing or unsaturated bond-containing chain-like organic esters.

The separator 112 is electrically insulated and also has good electrolyte retaining performance. According to some embodiments of the present disclosure, the separator 112 may be any kind of separators used in lithium-ion batteries known in the art, such as polyolefin micro-porous membrane, polyethylene felt, glass fiber felt or ultrafine glass fiber paper.

Figure 7:
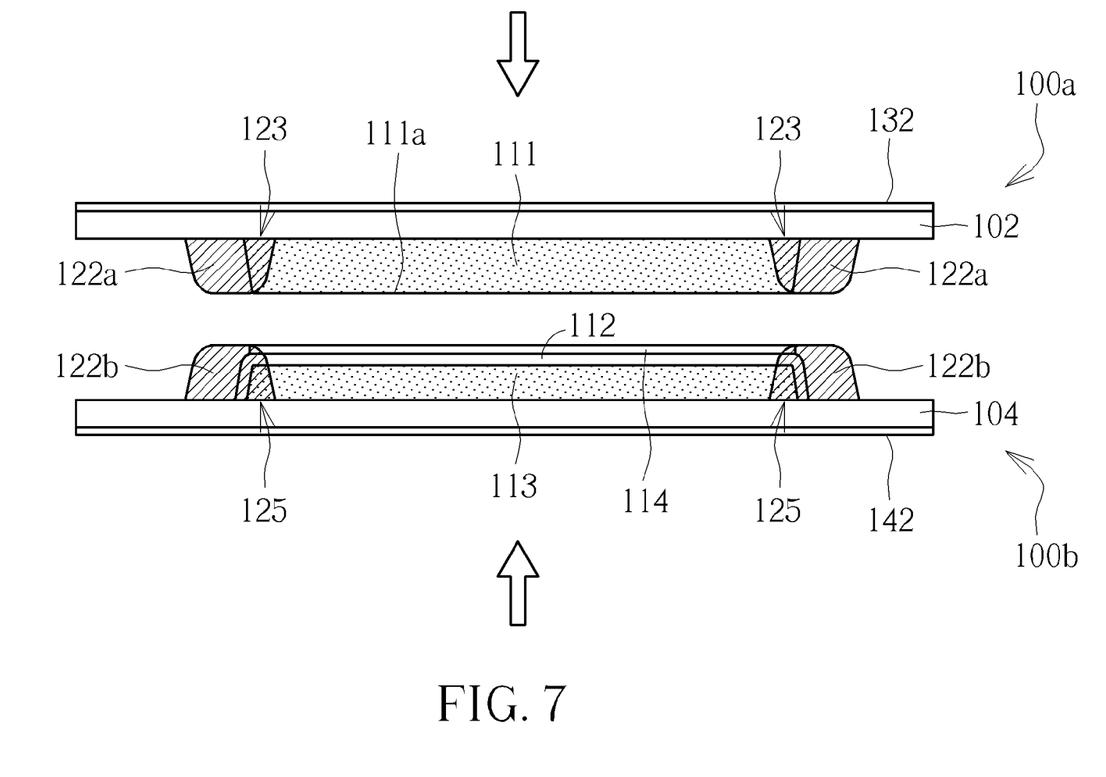
FIG. 7 to FIG. 9 show some other embodiments of the invention.
Figure 8:
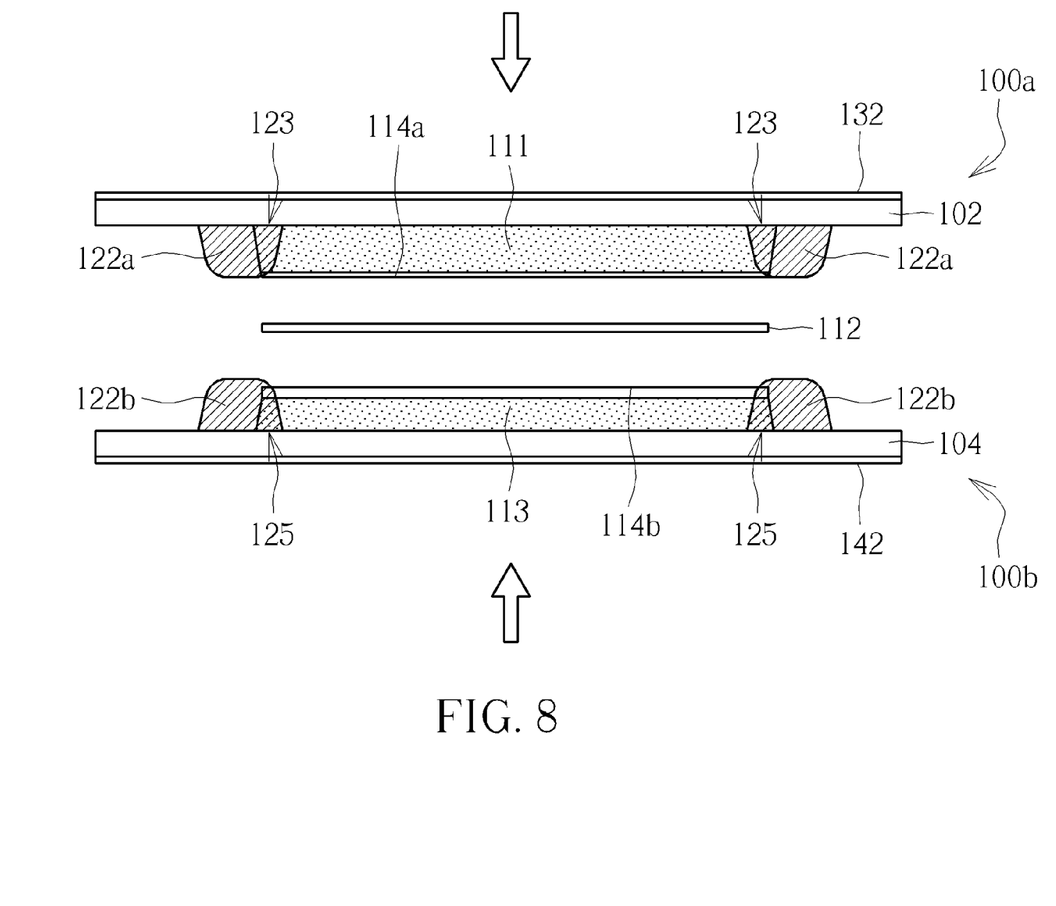
Figure 9:
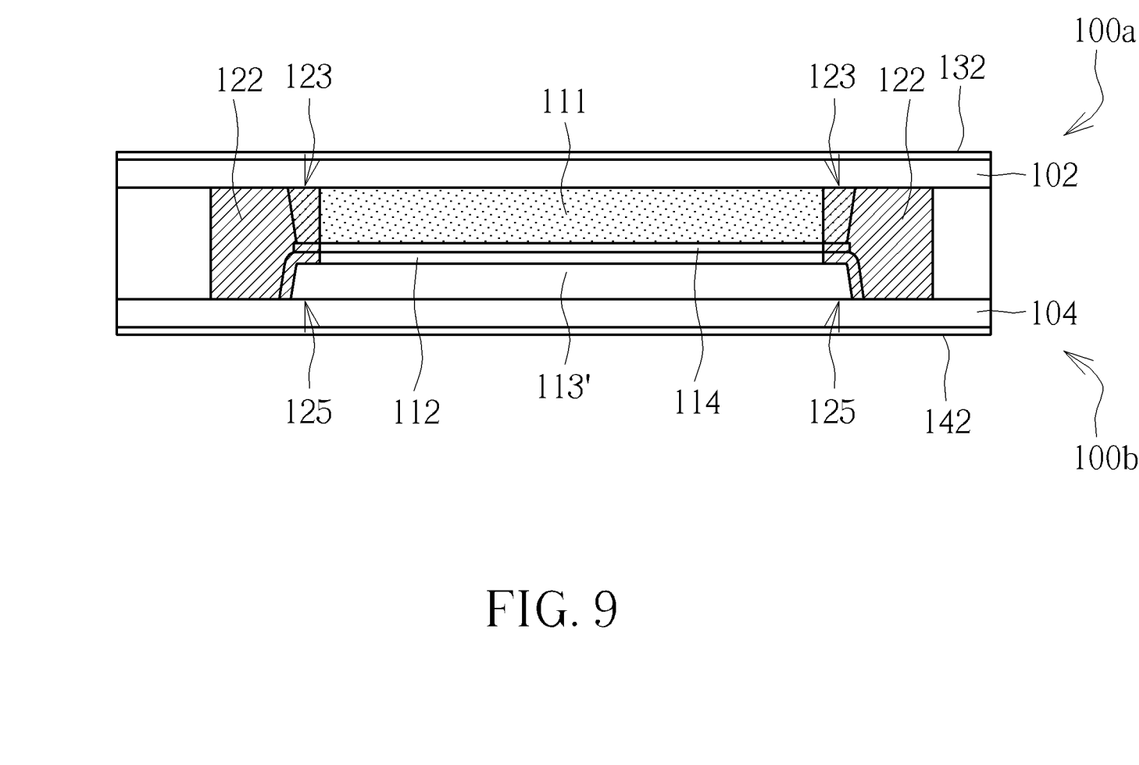

FIG. 7 to FIG. 9 show some other embodiments of the invention, wherein like numeral numbers designate like layers, regions, and elements. As shown in FIG. 7, the thin adhesive layer 114 is directly coated or sprayed onto the top surface of the separator 112 instead of forming on the first electrode active material layer 111. As shown in FIG. 8, the separator 112 may be in a form of a film or a foil, and is laminated with the first substrate 100a and second substrate 100b. A first adhesive layer 114a is coated on the first electrode active material layer 111. A second adhesive layer 114b is coated on the second electrode active material layer 113. As shown in FIG. 9, the second electrode active material layer 113' is made of a metal material. The sealant layer 122 only diffuses into the first electrode active material layer 111, the separator 112, and the thin adhesive layer 114.

Figure 10:
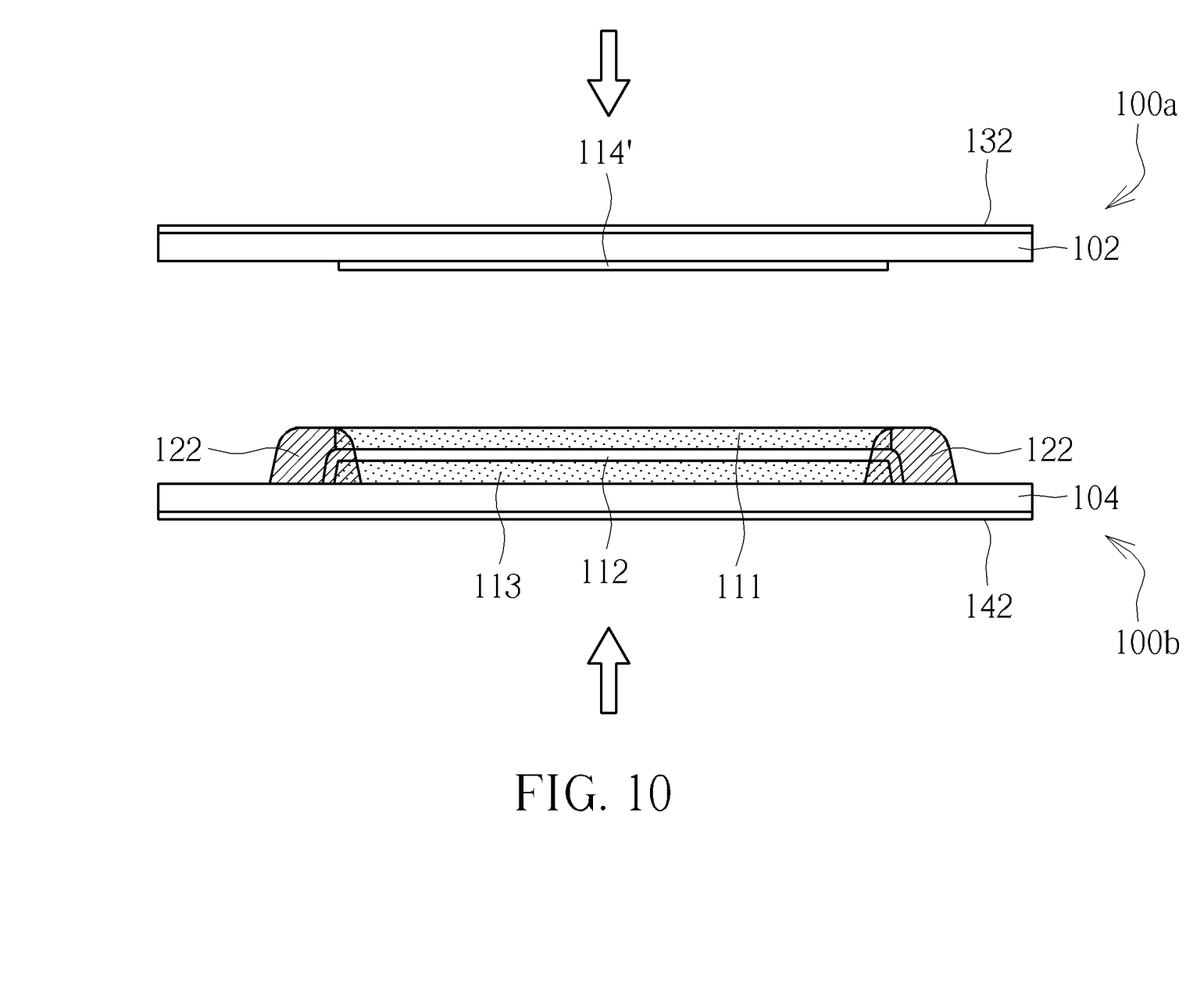
FIGS. 10 and 11 schematically illustrate a method for fabricating a bendable, robust electric core for thin film lithium-ion batteries according to another embodiment of the invention.
Figure 11:
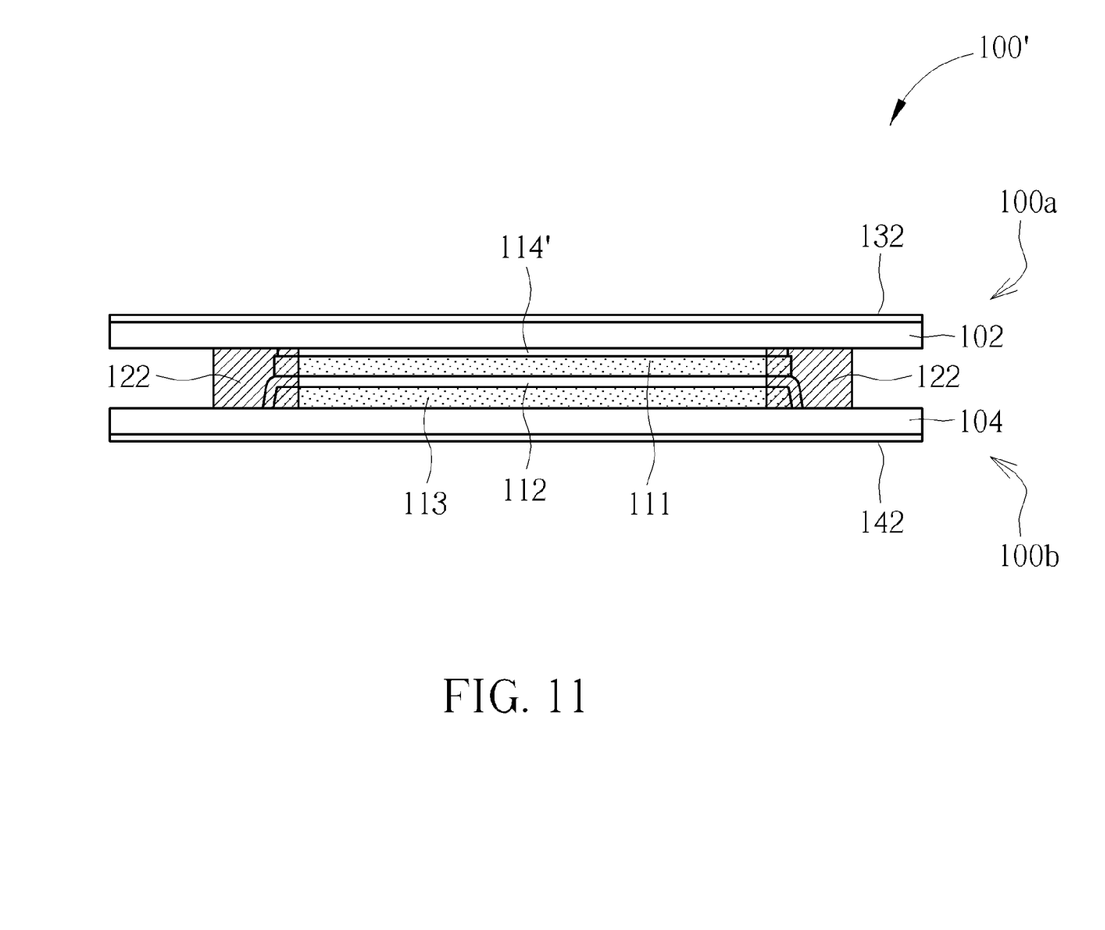

FIGS. 10 and 11 schematically illustrate an exemplary method for fabricating a bendable, robust electric core for thin film lithium-ion batteries according to another embodiment of the invention, wherein like numeral numbers designate like layers, regions, and elements. As shown in FIG. 10 and FIG. 11, likewise, a first substrate 100a and a second substrate 100b are prepared. According to the embodiment, the first substrate 100a comprises a first current collecting substrate 102 and a thin adhesive layer 114 directly coated or sprayed onto an inner surface of the first current collecting substrate 102. The outer surface of the first current collecting substrate 102 may be covered with a covering insulation layer 132 such as polyimide (PI), polyvinyl chloride (PVC), polypropylene (PP), polyethylene (PE), polycarbonate (PC), polyurethane (PU), or polyethylene terephthalate (PET), but not limited thereto. According to the embodiment, the adhesive layer 114' comprises conductive materials including, but not limited to, polyvinyl chloride (PVC), polyethylene terephthalate (PET), polyimide (PI), polypropylene (PP), polyethylene (PE), silica gel, acrylic, polymethylmethacrylate (PMMA), or epoxy materials mixed copper powder, aluminum powder, nickel powder, carbon powder.

The second substrate 100b comprises a second current collecting substrate 104, a second electrode active material layer 113 coated or screen printed on an inner surface of the second current collecting substrate 104, a separator 112 directly covering a top surface and sidewall of the second electrode active material layer 113, and a first electrode active material layer 111. On the bottom surface of the second current collecting substrate 104, a covering insulation layer 142 may be provided. The covering insulation layer 142 may comprise polyimide (PI), polyvinyl chloride (PVC), polypropylene (PP), polyethylene (PE), polycarbonate (PC), polyurethane (PU), or polyethylene terephthalate (PET), but not limited thereto.

Along the peripheral edges of the second electrode active material layer 113, a sealant layer 122 is provided. The sealant layer 122 may be formed on the inner surface of the second current collecting substrate 104 by using any suitable techniques known in the art, for example, screen printing or coating. The ingredients of the sealant layer 122 permeate into the first electrode active material layer 111, the separator 112, and the second electrode active material layer 113 to thereby form an elastic and robust overlapping interface along the peripheral edges of the second electrode active material layer 113. According to the embodiment, no space or gap is remained between the sealant layer 122 and the peripheral edges of the second electrode active material layer 113 because of the formation of the elastic and robust overlapping interface.

According to the embodiment, the first current collecting substrate 102 may be a positive current collecting substrate, the first electrode active material layer 111 may be a positive electrode active material layer, the second current collecting substrate 104 may be a negative current collecting substrate, and the second electrode active material layer 113 may be a negative electrode active material layer. However, it is understood that the aforesaid polarities may be interchangeable. For example, in another embodiment, the first current collecting substrate 102 may be a negative current collecting substrate, the first electrode active material layer 111 may be a negative electrode active material layer, the second current collecting substrate 104 may be a positive current collecting substrate, and the second electrode active material layer 113 may be a positive electrode active material layer.

According to the embodiment, the first electrode active material layer 111 and the second electrode active material layer 113 may be both wetted with a liquid electrolyte solution. According to another embodiment, the first electrode active material layer 111 and the second electrode active material layer 113 may be surrounded by an electrolyte gel or a solid-state electrolyte such as a solid polymer electrolyte.

As shown in FIG. 11, the first substrate 100a and the second substrate 100b may be bonded together by using vacuum laminating under heating and pressing conditions, thereby forming a laminate structure of an electric core 100'. For example, the first substrate 100a and the second substrate 100b may be bonded together in a heating-type vacuum press apparatus. However, it is understood that, in some cases, a vacuum laminating (without heating) and pressing process may be adequate. In other embodiments, the first substrate 100a and the second substrate 100b may be bonded together by chemical reactions.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A laminated electric core for a lithium-ion battery, comprising:
 a first current collecting substrate;
 a first electrode active material layer coated on an inner surface of the first current collecting substrate;
 a second current collecting substrate;
 a second electrode active material layer coated on an inner surface of the second current collecting substrate;
 a separator sandwiched between the first electrode active material layer and the second electrode active material layer, wherein an electrolyte is retained at least in the separator;
 an adhesive layer between the first electrode active material layer and the separator; and
 a first sealant layer on the inner surface of the first current collecting substrate along peripheral edges of the first electrode active material layer, wherein ingredients of the first sealant layer permeate through the adhesive layer into porous structure of the first electrode active material layer to thereby form an elastic and robust overlapping interface along peripheral edges of the first electrode active material layer.

2. The laminated electric core for a lithium-ion battery according to claim 1 wherein the adhesive layer has a plurality of through holes therein that communicate the first electrode active material layer with the separator.

3. The laminated electric core for a lithium-ion battery according to claim 1 wherein the adhesive layer creates an intimate interfacial contact between the first electrode active material layer and the separator, and effectively prevents delamination between the first electrode active material layer and the separator when the battery cell is bent.

4. The laminated electric core for a lithium-ion battery according to claim 1 wherein no space or gap is remained between the first sealant layer and the peripheral edges of the first electrode active material layer because of the formation of the elastic and robust overlapping interface.

5. The laminated electric core for a lithium-ion battery according to claim 4 wherein a second sealant layer is formed on the inner surface of the second current collecting substrate along peripheral edges of the second electrode active material layer.

6. The laminated electric core for a lithium-ion battery according to claim 5 wherein ingredients of the first sealant layer permeate through the separator into porous structure of the second electrode active material layer to thereby form an elastic and robust overlapping interface along peripheral edges of the second electrode active material layer.

7. The laminated electric core for a lithium-ion battery according to claim 6 wherein no space or gap is remained between the second sealant layer and the peripheral edges of the second electrode active material layer because of the formation of the elastic and robust overlapping interface.

8. The laminated electric core for a lithium-ion battery according to claim 1 further comprising a packaging layer provided to seal the laminated electric core.

9. The laminated electric core for a lithium-ion battery according to claim 1 wherein the adhesive layer comprises particles dispersed in a binder matrix.

10. The laminated electric core for a lithium-ion battery according to claim 9 wherein the binder matrix comprises polyvinylidene fluoride.

11. The laminated electric core for a lithium-ion battery according to claim 9 wherein at least some of the particles are encapsulated by an insulating coating.

12. The laminated electric core for a lithium-ion battery according to claim 11 wherein the insulating coating comprises polyvinyl chloride, polyethylene terephthalate, polyimide, polypropylene, polyethylene, silica gel, acrylic, or epoxy materials.

13. The laminated electric core for a lithium-ion battery according to claim 9 wherein the particles are non-conductive particles.

14. The laminated electric core for a lithium-ion battery according to claim 13 wherein the non-conductive particles comprise metal oxide or ceramic particles.

15. The laminated electric core for a lithium-ion battery according to claim 14 wherein the metal oxide comprises titanium oxide, aluminum oxide, or combination thereof.

16. The laminated electric core for a lithium-ion battery according to claim 11 wherein the particles have irregular shapes.

17. The laminated electric core for a lithium-ion battery according to claim 9 wherein the adhesive layer comprises two different kinds of particles dispersed in the binder matrix.

* * * * *